J. RICHARDS.
BOLL WEEVIL CATCHER.
APPLICATION FILED JAN. 29, 1917.
1,244,895.
Patented Oct. 30, 1917.
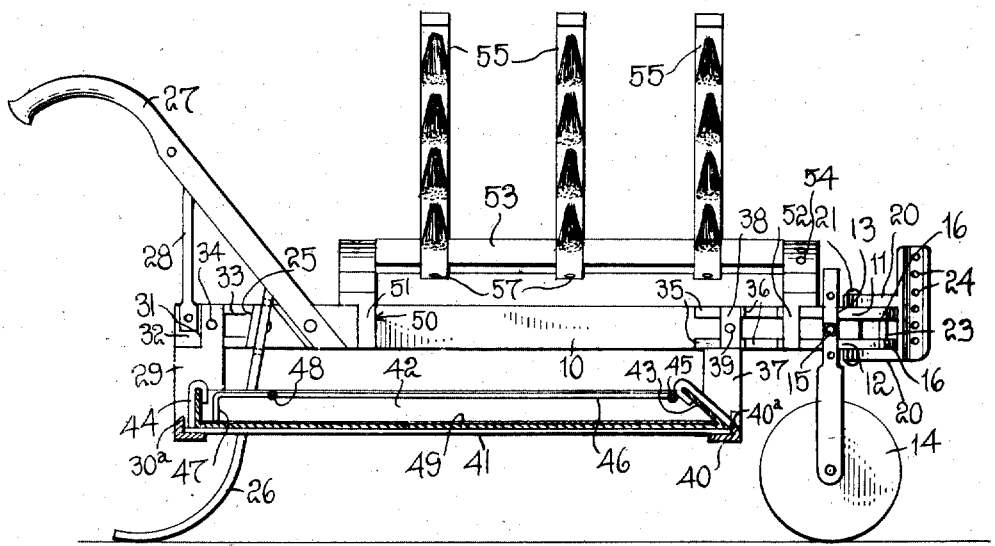
Fig. 1
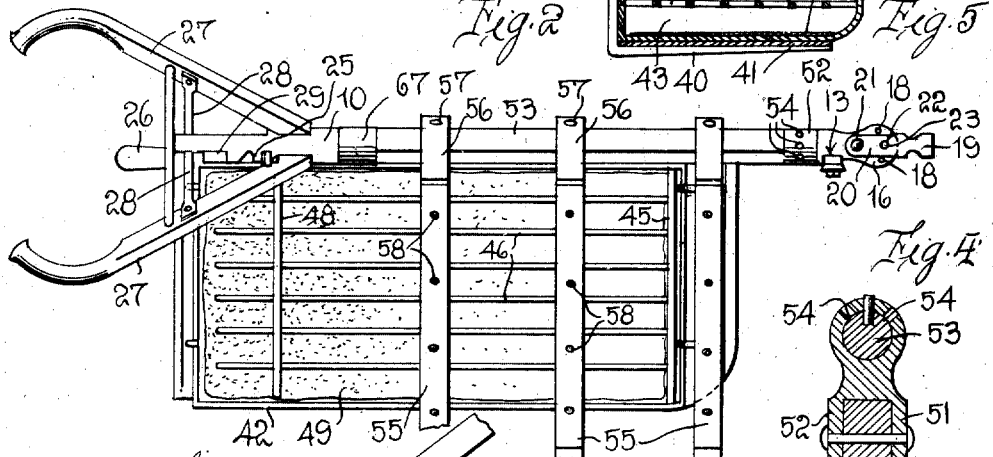
Fig. 2
Fig. 5
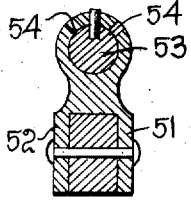
Fig. 4
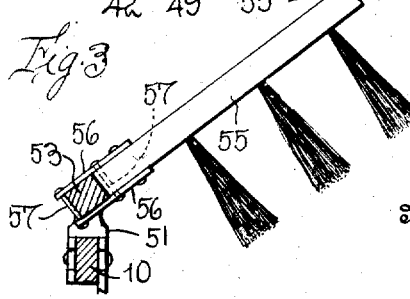
Fig. 3
Inventor
J. RICHARDS
By Watson E. Coleman
Attorney

UNITED STATES PATENT OFFICE.

JOE RICHARDS, OF TIMPSON, TEXAS.

BOLL-WEEVIL CATCHER.

1,244,895.             Specification of Letters Patent.      Patented Oct. 30, 1917.

Application filed January 29, 1917. Serial No. 145,220.

*To all whom it may concern:*

Be it known that I, JOE RICHARDS, a citizen of the United States, residing at Timpson, in the county of Shelby and State of Texas, have invented certain new and useful Improvements in Boll-Weevil Catchers, of which the following is a specification, reference being had to the accompanying drawings.
This invention relates to agricultural devices or machines and particularly to means for trapping boll weevils or other obnoxious insects.

The general object of the invention is the provision of a boll weevil trapping mechanism mounted upon wheels and adapted to be passed down between the rows of growing plants and including a trapping pan containing oil or like material and means for knocking the boll weevils from the plants onto the trapping pan.

More specifically the various objects of the invention are to improve the detailed construction of devices of this character and provide means in connection with the pan whereby the branches of the plants shall be prevented from dipping into the trough or pan containing the trapping liquid and a further object is to so construct this trapping pan or trough that it will not injure the plants or break the branches thereof.

A further object of the invention is to provide means for supporting plant shaking devices, which means shall be adjustable to various heights and inclinations to thereby adjust the machine for operating on plants of various heights.

Other objects of the invention have to do with improving the details of construction whereby to render the device simple, strong and effective.

My invention is illustrated in the accompanying drawings, wherein—

Figure 1 is a side elevation of my improved boll weevil catcher, the pan being in section;

Fig. 2 is a top plan view of the construction shown in Fig. 1;

Fig. 3 is a fragmentary sectional view through the bar 53 and the beam 10 showing the normal position of one of the brush supporting bars 55;

Fig. 4 is a vertical section through the member 51 and the trunnion of the beam 53.
Fig. 5 is a transverse sectional view of the trapping pan.

Referring to these drawings, it will be seen that my machine includes a longitudinally extending beam 10 which may be made of malleable iron or other suitable material.
This beam is about 48 inches long and may be of any desired cross sectional form and area. The forward end of the beam is provided with longitudinally extending flanges 11 and 12 which are vertically grooved as at 13 for the reception of the standard of the front wheel 14. This front wheel is vertically adjustable by means of a bolt 15. At its forward end the beam 10 is bifurcated and laterally enlarged, the forward end of the beam being laterally rounded. The two ears 16 formed by bifurcating the beam are provided with the vertically disposed rear pin engaging passage 17 and with a plurality of passages 18 arranged arcuately. The clevis 19 has rearwardly extending ears 20 provided at their rear ends with passages for the reception of the bolt 21 or pin and with perforations 22 for the reception of a locking pin 23 whereby the clevis may be held in any angularly adjusted position to the line of draft. The clevis is provided with a plurality of perforations 24 for engagement with draft devices.

At its rear end the beam is formed with a downwardly and rearwardly directed lug 25 and with a rear drag 26 which extends downward and then bent rearward and may be attached to the rear beam in any suitable manner. This drag is preferably adjustable so that the lower end of the drag is on a level with the wheel 14. Handles 27 are also attached adjacent the rear end of the beam, these handles being braced by the braces 28. Extending downward from the rear end of the beam is a leg 29. This leg extends downward and then laterally as at 30 and the upper end of the leg 29 is cut away as at 31 so as to fit against a lug 32 formed on the beam and the upper end of the leg fits against lugs 33 formed on the beam. The leg is held in place by bolts 34. Toward the forward end of the beam the beam is formed with the pairs of lugs 35 and 36 and attached to this portion of the beam is the downwardly extending leg 37, the upper end of which is cut away to provide a portion 38 extending between the lugs 35 and 36 and this leg is attached to the beam by means of the bolts 39. The leg then extends laterally as at 40. Operatively supported upon the laterally turned ends 30 and 40 of the legs 29 and 37 is a longitudinally extending shoe 41 of heavy galvanized metal. This shoe 41 is connected to the parts 30 and 40 by means of flat head bolts. Mounted on the shoe 41 is the pan or trough 42 which is made of galvanized tin or other suitable material, this pan being about 40 inches in length, 3 inches in depth and for the greater portion of its length about 15 inches in width. The forward wall 43 of the pan is upwardly and rearwardly inclined and the pan is held in place by rear bolts 44 extending upward from the member 30 and bent over at the top to engage over the wall of the pan and by forward bolts 45 which are also bent over at their upper ends and engaged over the upper edge of the forward wall. Across the forward end of the pan extends a rod 45 which is rotatably mounted in the side walls of the pan and attached to this rod are a plurality of guards 46 which extend rearward the full length of the pan and at their rear ends are downwardly bent as at 47 so as to rest loosely on the bottom of the pan. A brace 48 connects the rear ends of the guards 46. Disposed in the bottom of the trough or pan is a kerosene soaked strip of absorbent cloth 49. The object of the guards 46 is to prevent cotton branches from dipping into the trough or pan. The forward end of the pan is 14 inches in width and is increased gradually to a width of 16 inches at a distance of about 5 inches from the front end of the pan. The object of having the forward end of the pan inclined and the corner and lateral edge of the pan rounded is to keep the front end of the pan from coming in contact with the cotton stalks and the side of the pan from injuring the cotton stalks. The object of the shoe 41 is to protect the pan from wearing out. Each leg 37 and 29 is to be made of steel about ⅜ of an inch thick from its upper end to its lower end, the portion 40 of leg 37 to be gradually thinned down to about ¼ of an inch thick at its outer end. The forward edge of the portion 40 is formed with a flange 40ª which protects the forward edge of the trough and keeps this forward edge from coming in contact with stumps. The rear leg 29 is also to be made of steel but may be made of less thickness than the forward leg as it is subjected to less strain. The portion 30 of this leg is also formed with a flange 30ª.

The beam 10 is also formed with grooves 50 for the reception of the lower reduced ends of upwardly projecting ears 51 and 52, these ears having their reduced ends bolted to the beam. The upper ends of the ears are longitudinally perforated for engagement by the trunnions of a rocking beam 53. The forward ear 52 is formed with a plurality of radially extending bores 54 and the corresponding trunnion of the beam 53 is formed with perforations so that a pin may be inserted through any one of the bores 54 and into the perforation in the trunnion so as to hold the beam 53 set in any rotatably adjusted position. Projecting radially from the beam 53 are a plurality of bars 55 preferably square, these bars being held to the beam by means of laterally disposed straps 56 bolted to the bars and having bolts 57 passing beneath the beam and clampingly engaging the beam. Preferably the beam is cut away for the reception of these straps. The bars 55 are formed with a plurality of perforations 58 into which brushes or branches of like nature may be placed which will brush against the cotton stalks and knock off all the loose "squares" and boll weevils. The "squares" or bolls which fall into the pan may be burned, while the weevils falling into the pan will be killed by the oil saturated cloth. The beam 53 is to be made of hard wood and is about 30 inches in length from end to end.

The practical use of my invention will be obvious from what has gone before. It will be obvious that the device may be constructed to have the trough extend over on the right hand or the left hand so that two machines may be used, one on each side of a row of cotton at the same time and both acting to brush or sweep the boll weevils or other insects off into the trapping trough. It will be seen that the machine is so constructed as not to injure cotton plants, that it is light and strongly made, and that it may be adjusted to various heights of plants. It will be also obvious that two troughs or pans might be supported upon the single beam, these troughs or pans extending in opposite directions.

The clevis 24 is mounted to swing or be laterally adjusted so as to permit the machine to be used in rows of various widths and so as to give more latitude for the animal pulling the machine.

The brush carrying bars 55 will ordinarily be disposed in an angular position, that, for instance, shown in Fig. 3. The position of these bars, however, will depend entirely upon the height of the cotton plant where the machine is working. The brushes carried by the bars 55 are adjustable in the sense that four brushes may be used on each bar, or one or two brushes set nearer to or farther from the end of the bar. When working on cotton plants whose height is about equal to that of the machine, the brushes would point out horizontally, while in plants which are higher or lower than the level of the brushes, the bars may be placed at an angle.

Having described my invention, what I claim is:

1. A boll weevil catcher comprising a wheel-supported beam, handles extending from the beam, a trapping pan disposed in a horizontal plane and operatively mounted upon the beam, and means mounted upon the beam and parallel thereto for supporting brushes above the pan, said means being rotatably shiftable in a vertical plane to thereby vertically and angularly adjust the brushes.

2. A boll weevil catcher comprising a wheel-supported beam, handles at the rear end of the beam, a trapping pan disposed in a horizontal plane and operatively mounted upon the beam, and means mounted upon the beam for supporting brushes above the pan, said means including a longitudinally extending beam rotatably mounted upon the main beam and having radially projecting bars, the bars being perforated to receive brushes, and means for holding the rotatable beam in any angularly adjusted position.

3. In a boll weevil catcher of the character described, a beam having a wheel at its forward end and a runner at its rear end, a trough operatively mounted upon the beam and disposed in a horizontal plane to one side of the beam, the forward end of the trough being inclined, and guards extending longitudinally along the trough.

4. In a boll weevil catcher of the character described, a beam having ground engaging elements at its forward and rear ends, a trough operatively mounted upon the beam and disposed in a horizontal plane to one side of the beam, the forward end of the trough being inclined, and guards extending longitudinally along the trough, said guards being pivotally mounted at their forward ends for unitary movement in a vertical plane.

5. In a boll weevil catcher, a supporting member, forward and rear transversely extending bars having upwardly extending flanges, a pan disposed upon these bars and between said flanges, and means holding the pan to said bars, the forward end of the pan being upwardly and rearwardly inclined and the forward outer corner of the pan being rounded.

6. In a boll weevil catcher, a wheel-supported frame, a trapping trough operatively mounted upon the frame, and means extending from the frame for supporting a plurality of brushes in a position projecting transversely over the trapping trough, said means extending upward and outward from the frame and supporting said brushes with their ends in an upwardly and outwardly inclined plane.

In testimony whereof I hereunto affix my signature in the presence of two witnesses.

JOE RICHARDS.

Witnesses:
F. ROOKE,
J. H. NEEL.

Copies of this patent may be obtained for five cents each, by addressing the "Commissioner of Patents, Washington, D. C."